United States Patent
Lung et al.

(10) Patent No.: US 9,451,388 B1
(45) Date of Patent: Sep. 20, 2016

(54) FRAMEWORK AND METHOD FOR PROCESSING COMMANDS FOR CONTROLLING ELECTRONIC DEVICES

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chang-Fong Lung, New Taipei (TW); Jia Sun, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/735,976

(22) Filed: Jun. 10, 2015

(51) Int. Cl.
*H04W 4/00* (2009.01)
*H04L 12/24* (2006.01)

(52) U.S. Cl.
CPC .............. *H04W 4/006* (2013.01); *H04L 41/00* (2013.01)

(58) Field of Classification Search
CPC ........................ H04L 41/0869; H04L 41/0873
USPC ...................... 455/410, 411, 418, 420, 414.1
See application file for complete search history.

(56) References Cited

U.S. PATENT DOCUMENTS

| 7,336,622 B1 * | 2/2008 | Fallis ...................... H04L 49/45 370/252 |
| 9,038,165 B2 * | 5/2015 | Shigemasa .............. G06F 21/00 726/17 |
| 2014/0167931 A1 * | 6/2014 | Lee ........................ G08C 17/02 340/12.5 |

* cited by examiner

Primary Examiner — John J Lee
(74) Attorney, Agent, or Firm — Zhigang Ma

(57) ABSTRACT

A framework for processing a number of commands for controlling a number of electronic devices includes a number of control servers and a number of terminals. Each control server controls corresponding one or more electronic devices. Each control server communicates with one or more terminals. Each control server receives commands from the corresponding terminals to control the corresponding electronic devices. Each control server sets an authority level of each of the corresponding terminals. A first control server is able to authorize a second control server to control one or more of the electronic devices controlled by the first control server. The terminals communicating with the second control server have a higher authority level than the terminals communicating with the first control server for controlling the one or more electronic devices that the first control server authorized the second control server to control.

18 Claims, 4 Drawing Sheets

FRAMEWORK AND METHOD FOR PROCESSING COMMANDS FOR CONTROLLING ELECTRONIC DEVICES

FIELD

The subject matter herein generally relates to smart home technologies, and more particularly to a framework and a method for determining which commands of a plurality of commands to execute to control a plurality of electronic devices.

BACKGROUND

Generally, smart electronic devices are controlled remotely by a user sending commands to a server. However, when two or more users send commands to the server for controlling the same smart electronic device at the same time, it can be difficult for the server to determine which command to execute.

BRIEF DESCRIPTION OF THE DRAWINGS

Implementations of the present technology will now be described, by way of example only, with reference to the attached figures.

DETAILED DESCRIPTION

Figure 1:
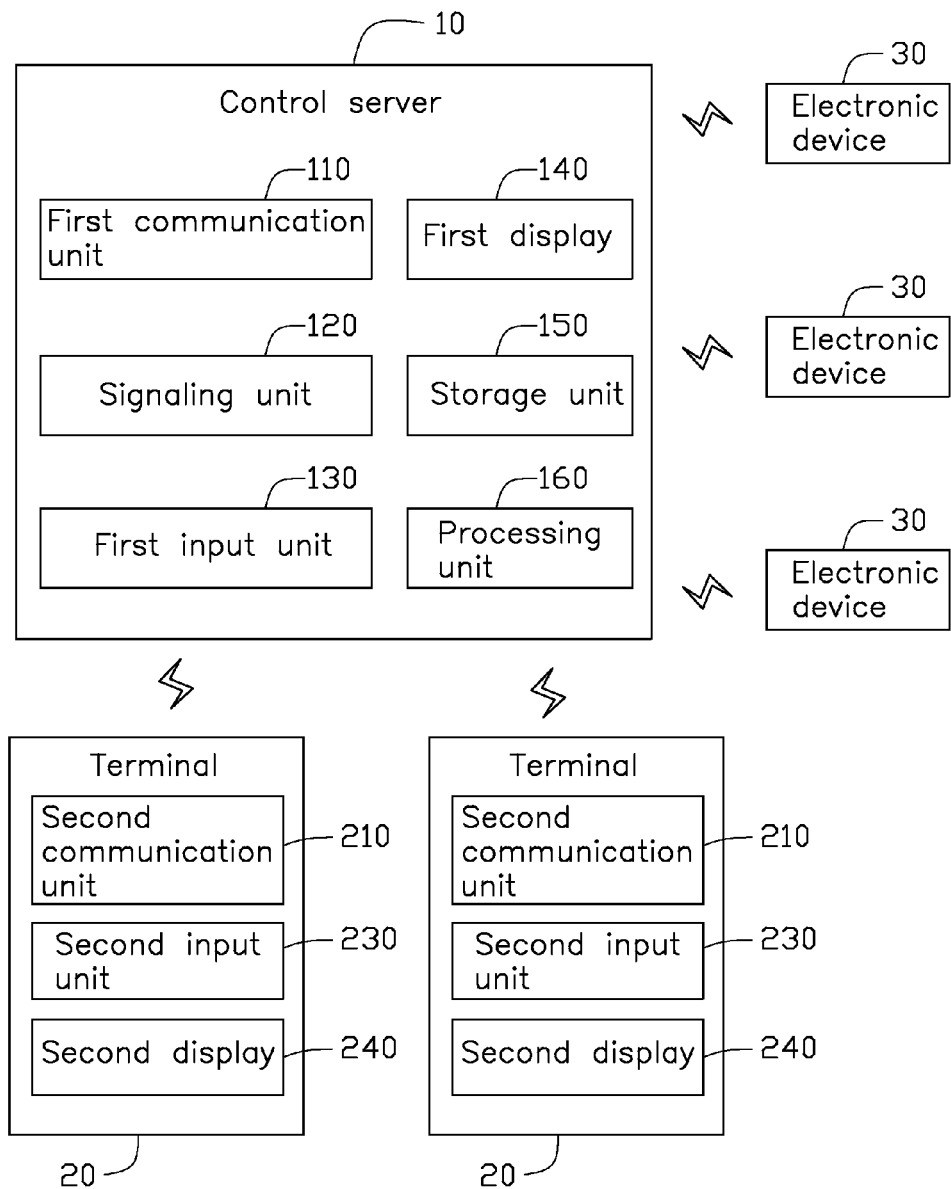
FIG. 1 is a block diagram of a first embodiment of a framework for processing a plurality of commands for controlling a plurality of electronic devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of a framework for processing a plurality of commands for controlling a plurality of electronic devices 30. The framework can include a control server 10 and a plurality of terminals 20. The control server 10 can wirelessly communicate with each of the plurality of terminals 20 and can wirelessly control each of the electronic devices 30. Each of the terminals 20 can send commands to the control server 10 to control the electronic devices 30. In at least one embodiment, the control server 10 can set an authority level for each of the terminals 20. For example, when two terminals 20 send different commands for controlling one of the electronic devices 30 at the same time, the control server 10 can execute the command sent from the terminal 20 having a higher authority level and ignore the command sent from the terminal 20 having a lower authority level. In at least one embodiment, the terminals 20 can be mobile phones, tablet computers, or the like.

The control server 10 can include a first communication unit 110, a signaling unit 120, a first input unit 130, a first display 140, a storage unit 150, and a processing unit 160. The first communication unit 110 can establish wireless communication with each of the terminals 20 and receive the commands from the terminals 20. The signaling unit 120 can send signals to the corresponding electronic devices 30 according to the commands received from the terminals 20 to control the electronic devices 30. The first input unit 130 can allow the control server 10 to receive user input for setting the authority levels of the terminals 20 and managing the electronic devices 30. The first display 140 can display an interface of the control server 10. The processing unit 160 can execute functions of the control server 10 for controlling the plurality of electronic devices 30.

Each terminal 20 can include a second communication unit 210, a second input unit 230, and a second display 240. The second communication unit 210 can establish wireless communication with the first communication unit 110 of the control server 10. The second input unit 230 can receive user input for sending commands to the control server 10. The second display 240 can display a corresponding interface for sending the commands.

In at least one embodiment, the control server 10 can determine whether any of the terminals 20 has a history of sending commands for controlling corresponding electronic devices 30 at a specific time. For example, if a user of a first terminal 20 has a history of sending a command to set a temperature of an air conditioner to twenty-five degrees at 19:00, the control server 10 can record in the storage unit 150 that the first terminal 20 sends the command to set the temperature of the air conditioner to twenty-five degrees at 19:00. In at least one embodiment, the control server 10 can determine whether any of the terminals 20 has a history of sending commands for controlling corresponding electronic devices 30 from a specific location. For example, if the user of the first terminal 20 has a history of sending the command to set the temperature of the air conditioner when the user is in the living room, then the control server 10 can record in the storage unit 150 that the first terminal 20 sends the command to set the temperature of the air conditioner when the first terminal 20 is in the living room. In at least one embodiment, the history of sending the commands at the specific time can be recorded when the command has been sent at the same time for at least three days in a row, and the history of sending the commands from the specific location can be recorded when the command has been sent from the same location at least three times in a row, for example.

The storage unit 150 can store a plurality of preset rules for determining which command of a command conflict to execute. In at least one embodiment, a command conflict is defined as two or more terminals 20 each sending a command within a predetermined time duration for controlling the same electronic device 30. Thus, the control server 10 can analyze different situations for determining which command to execute before referring to the authority levels of the terminals 20. In at least one embodiment, a length of the predetermined time duration for determining the command conflict can be predetermined for each electronic device.

In at least one embodiment, the plurality of preset rules can include the following: executing the command sent by the terminal 20 that has a history of sending the command at a specific time, executing the command sent by the terminal 20 that has a history of sending the command from a specific location, and executing the command sent by the terminal 20 located closest to the corresponding electronic device 30 when a distance between two of the terminals 20 involved in the command conflict is greater than a predetermined distance. For example, when two terminals 20 send a command for controlling an air conditioner, the control server 10 executes the command sent by the terminal 20 located closer to the air conditioner when the distance between the two terminals 20 is greater than five meters (i.e., the user of the terminal 20 located closer to the air conditioner should be better able to feel the temperature setting of the air conditioner than the user of the terminal 20 located farther from the air conditioner). When two terminals 20 involved in the command conflict send the command to control the electronic device 30 when the distance between the two terminals 20 is less than the predetermined distance, or when the command conflict cannot be resolved by the plurality of preset rules, the control server 10 executes the command from the terminal 20 having the higher authority level.

In at least one embodiment, the preset rules of the plurality of preset rules to apply for resolving the command conflicts can be customized for each electronic device 30. For example, only one of the preset rules can be applied for resolving a command conflict for controlling a first electronic device, and two of the preset rules can be applied for resolving a command conflict for controlling a second electronic device.

Figure 2:
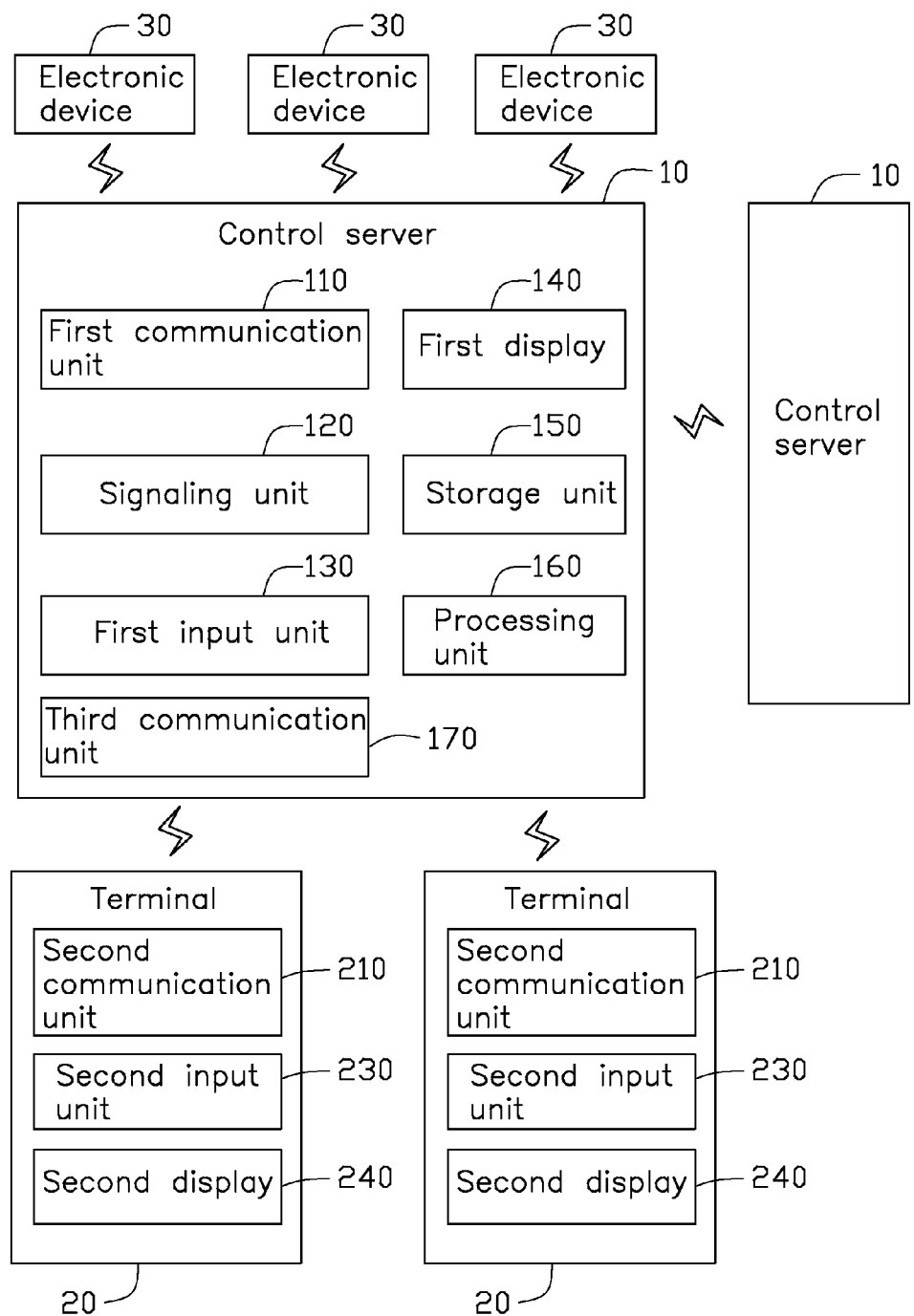
FIG. 2 is a block diagram of a second embodiment of a framework for processing a plurality of commands for controlling a plurality of electronic devices.

FIG. 2 illustrates a second embodiment of a framework for processing a plurality of signals for controlling a plurality of electronic devices 30. The second embodiment is substantially similar to the first embodiment, except that the plurality of electronic devices 30 can be controlled by a plurality of control servers 10. Each control server 10 can receive commands from corresponding terminals 20 to control corresponding different electronic devices 30. Each control server 10 can further include a third communication unit 170 to communicate with another control server 10. In at least one embodiment, a first control server 10 can communicate with a second control server 10 to authorize the second control server 10 to control one or more corresponding electronic devices 30 controlled by the first control server 10. For example, the first control server 10 can authorize the second control server 10 to control a first electronic device 30, and when the second control server 10 is authorized by the first control server 10, the first control server 10 sets the authority levels of the terminals 20 communicating with the second control server 10 to be higher than the authority levels of the terminals 20 communicating with the first control server 10 for controlling the first electronic device 30. Thus, when a command conflict involves a terminal 20 communicating with the first control server 10 and a terminal 20 communicating with the second control server 10, when the first control server 10 cannot determine which command to execute according to the plurality of preset rules, the first control server 10 executes the command sent by the terminal communicating with the second control server 10.

Figure 3:
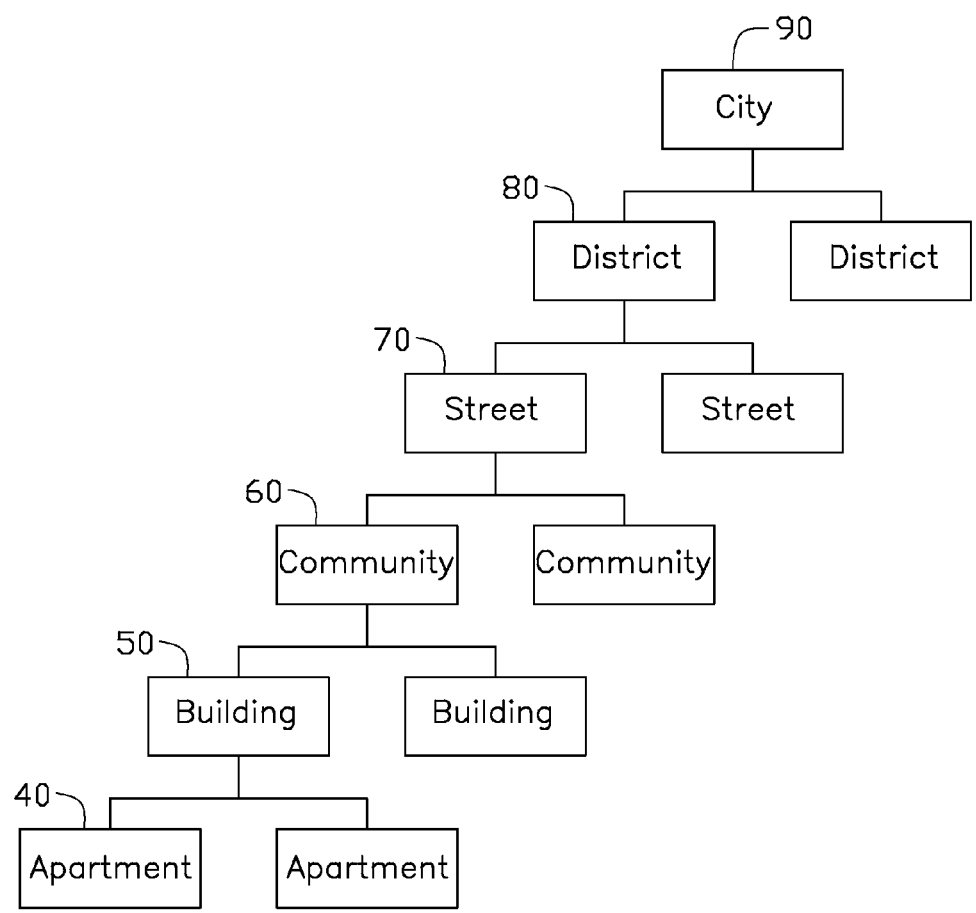
FIG. 3 is a block diagram of an example situation for implementing the framework for processing a plurality of commands for controlling a plurality of electronic devices.

FIG. 3 illustrates an example situation for implementing the second embodiment of the framework for processing a plurality of signals for controlling a plurality of electronic devices. In the example situation, the first control server 10 can be implemented by an owner of an apartment 40, and the second control server 10 can be implemented by a manager of a building 50. The first control server 10 can authorize the second control server 10 to control one or more electronic devices controlled by the first control server 10. For example, the owner of the apartment 40 can authorize the manager of the building 50 to control a radio to broadcast important information about the building 50, and each of the terminals 20 communicating with the second control server 10 can send commands to the first control server 10 to control the radio. The second control server 10 can also authorize a third control server 10 implemented by a manager of a community 60 to control the radio of the apartment 40 to broadcast important information about the community 60, and each of the terminals 20 communicating with the third control server 10 can send commands to the first control server 10 to control the radio. In this example, the terminals 20 communicating with the third control server 10 have a higher authority level than the terminals 20 communicating with the second control server 10 for controlling the radio of the apartment 40, and the terminals 20 communicating with the second control server 10 have a higher authority level than the terminals 20 communicating with the first control server 10 for controlling the radio of the apartment 40.

The example situation can also include a fourth control server 10 implemented by a manager of a street 70, a fifth control server 10 implemented by a manager of a district 80, and a sixth control server 10 implemented by a manager of a city 90. Thus, the owner of the apartment 40 determines which electronic devices 30 are suitable to be controlled by other control servers 10.

Figure 4:
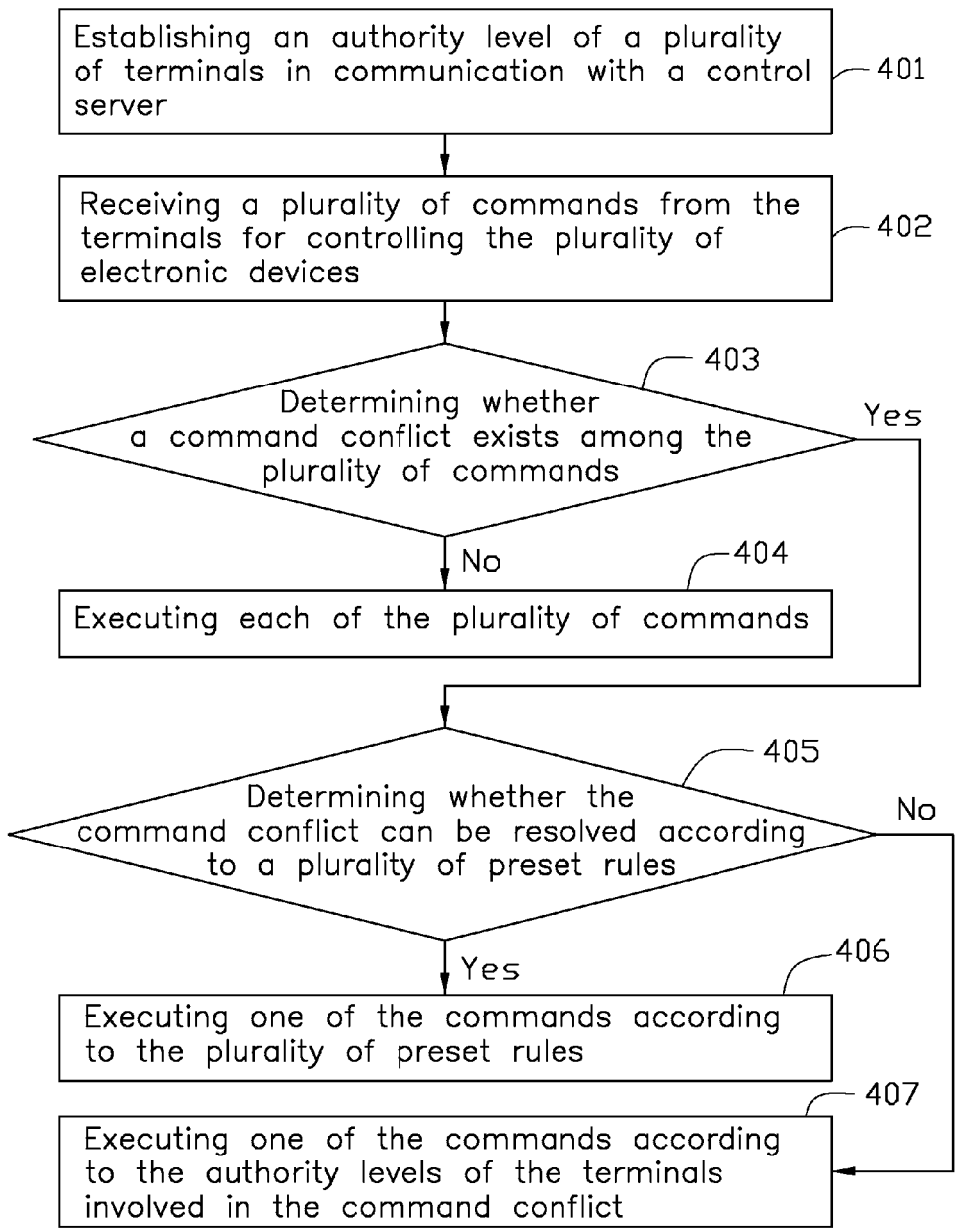
FIG. 4 is a flowchart of a method for processing a plurality of commands for controlling a plurality of electronic devices.

FIG. 4 illustrates a flowchart of an exemplary method for processing a plurality of commands for controlling a plurality of electronic devices. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 401.

At block 401, a control server can establish an authority level of a plurality of terminals in communication with the control server. When two terminals each send a command to the control server to control the same electronic device, the control server can execute the command sent by the terminal having the higher authority level.

At block 402, the control server can receive a plurality of commands from the terminals for controlling the plurality of electronic devices.

At block 403, the control server can determine whether a command conflict exists among the plurality of commands. The command conflict is defined as receiving two or more commands within a predetermined time duration for controlling the same electronic device. When the control server determines that there is no command conflict, block 404 is implemented. Otherwise, when the control server determines that there is a command conflict, block 405 is implemented.

At block 404, the control server can execute each of the plurality of commands in sequence of receiving the commands.

At block 405, the control server can determine whether the command conflict can be resolved according to a plurality of preset rules.

In at least one embodiment, the control server can determine whether any of the terminals has a history of sending commands for controlling corresponding electronic devices at a specific time. For example, if a user of a first terminal has a history of sending a command to set a temperature of an air conditioner to twenty-five degrees at 19:00, the control server can record that the first terminal sends the command to set the temperature of the air conditioner to twenty-five degrees at 19:00. In at least one embodiment, the control server can determine whether any of the terminals has a history of sending commands for controlling corresponding electronic devices from a specific location. For example, if the user of the first terminal has a history of sending the command to set the temperature of the air conditioner when the user is in the living room, then the control server can record that the first terminal sends the command to set the temperature of the air conditioner when the first terminal is in the living room.

In at least one embodiment, the plurality of preset rules can include the following:

when the control server determines that one of the terminals involved in the command conflict has a history of sending the command at a specific time, executing the command sent by the terminal that sends the command at the specific time; when the control server determines that one of the terminals involved in the command conflict has a history of sending the command from a specific location, executing the command sent by the terminal that sends the command from the specific location; and executing the command sent by the terminal located closest to the corresponding electronic device when a distance between two terminals involved in the command conflict is greater than a predetermined distance.

When the control server determines that the command conflict can be resolved according to the plurality of predetermined rules, block 406 is implemented. Otherwise, when the control server determines that the command conflict cannot be resolved according to the plurality of predetermined rules, block 407 is implemented.

At block 406, the control server executes one of the commands according to the plurality of preset rules.

At block 407, the control server executes one of the commands according to the authority levels of the terminals involved in the command conflict.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including, the full extent established by the broad general meaning of the terms used in the claims.

What is claimed is:

1. A method for processing a plurality of commands for controlling a plurality of electronic devices, the commands being received by a plurality of control servers from a plurality of terminals, each control server communicating with corresponding one or more terminals and controlling one or more electronic devices, the method comprising:
   establishing, by each of the control servers, an authority level of each of the corresponding terminals in communication with the control server;
   receiving, by the plurality of control servers, the plurality of commands;
   determining, by the control servers, whether a command conflict exists among the plurality of commands;
   executing, by the control servers, each of the plurality of commands when no command conflict exists among the plurality of commands;
   determining, by the corresponding control server when a command conflict exists among the plurality of commands, whether the command conflict is resolvable according to a plurality of preset rules;
   executing, by the corresponding control server when the command conflict is resolvable according to the plurality of preset rules, one of the commands according to the plurality of preset rules; and
   executing, by the corresponding control server when the command conflict is unresolvable according to the plurality of preset rules, one of the commands according to the authority levels of the terminals involved in the command conflict;
   wherein the command conflict is defined as receiving a command from two or more terminals for controlling the same electronic device within a predetermined time duration; and
   wherein a length of the predetermined time duration for determining the command conflict is preset for each electronic device.

2. The method as in claim 1, wherein:
   a first control server authorizes a second control server to control one or more electronic devices controlled by the first control server; and
   the terminals communicating with the second control server have a higher authority level than the terminals communicating with the first control server for controlling the one or more electronic devices that the first control server authorized the second control server to control.

3. The method as in claim 2, wherein the second control server authorizes a third control server to control one or more electronic devices controlled by the second control server; the second control server authorizes the third control server to control the one or more electronic devices that the first control server authorized the second control server to control; the terminals communicating with the third control server have a highest authority level of the terminals communicating with the first, second, and third control servers for controlling the one or more electronic devices that the first control server authorized the second control server to control.

4. The method as in claim 3, wherein each control server is authorizable by a plurality of other control servers to control one or more electronic devices of the plurality of other control servers.

5. The method as in claim 4, wherein each control server determines whether any of the corresponding terminals in communication with the control server has a history of sending commands for controlling corresponding electronic devices at a specific time interval; and each control server determines whether any of the corresponding terminals in communication with the control server has a history of sending commands for controlling corresponding electronic devices from a specific location.

6. The method as in claim 5, wherein the plurality of preset rules comprises:
   when one of the terminals involved in the command conflict has a history of sending the command at a specific time, executing the command sent by the terminal that sends the command at the specific time;
   when one of the terminals involved in the command conflict has a history of sending the command from a specific location, executing the command sent by the terminal that sends the command from the specific location; and
   executing the command sent by the terminal located closest to the corresponding electronic device when a distance between two terminals involved in the command conflict is greater than a predetermined distance.

7. The method as in claim 4, wherein:
   when a command conflict is determined to exist and the command conflict is unresolvable according to the plurality of preset rules, the smart system determines which command to execute according to the authority levels; and
   the preset rules of the plurality of preset rules to apply for resolving the command conflicts are customizable for each electronic device.

8. A framework for processing a plurality of commands for controlling a plurality of electronic devices, the framework comprising:
   a plurality of control servers, each control server configured to control corresponding one or more electronic devices; and
   a plurality of terminals communicating with the plurality of control servers, each control server communicating with one or more terminals, and each terminal configured to send commands to the corresponding control server to control the corresponding one or more electronic devices;
   wherein each control server receives commands from the corresponding terminals to control the corresponding electronic devices;
   wherein each control server sets an authority level of each of the corresponding terminals;
   wherein a first control server authorizes a second control server to control one or more of the electronic devices controlled by the first control server; and
   wherein the terminals communicating with the second control server have a higher authority level than the terminals communicating with the first control server for controlling the one or more electronic devices that the first control server authorized the second control server to control.

9. The framework as in claim 8, wherein the second control server authorizes a third control server to control one or more electronic devices controlled by the second control server; the second control server authorizes the third control server to control the one or more electronic devices that the first control server authorized the second control server to control; and the terminals communicating with the third control server have a highest authority level of the terminals communicating with the first, second, and third control servers for controlling the one or more electronic devices that the first control server authorized the second control server to control.

10. The framework as in claim 9, wherein each control server is authorizable by a plurality of other control servers to control one or more electronic devices of the plurality of other control servers.

11. The framework as in claim 10, wherein when two or more terminals send a command to one of the control servers for controlling the same electronic device, the control server determines whether a command conflict exists, and when a command conflict exists, further determines which command to execute according to a plurality of preset rules or according to the authority levels of the terminals, the command conflict being defined as the control server receiving two or more commands for controlling the same electronic device within a predetermined time duration.

12. The framework as in claim 11, wherein each control server comprises:
   a first communication unit configured to wirelessly communicate with the corresponding terminals to receive commands for controlling the corresponding electronic devices;
   a signaling unit configured to wirelessly send signals to the corresponding electronic devices to control the electronic devices;
   a first input unit configured to receive user input for setting the authority levels of the terminals, managing the corresponding electronic devices 30, and authorizing another control server to control one or more of the corresponding electronic devices;
   a first display configured to display an interface of the control server;
   a storage unit configured to store the plurality of preset rules and a plurality of instructions of the smart system; and
   a processing unit configured to execute functions of the control server.

13. The framework as in claim 12, wherein each control server further comprises a third communication unit configured to communicate with other control servers for authorizing the other control servers to control the one or more electronic devices.

14. The framework as in claim 11, wherein each of the plurality of terminals comprises:
   a second communication unit configured to send commands to the corresponding control server;
   a second input unit configured to receive user input for sending the commands to the corresponding control server; and
   a second display configured to display a corresponding interface of each of the corresponding electronic devices for sending the commands.

15. The framework as in claim 11, wherein the control server determines whether any of the corresponding terminals has a history of sending commands for controlling corresponding electronic devices at a specific time; and the control server determines whether any of the corresponding terminals has a history of sending commands for controlling corresponding electronic devices from a specific location.

16. The framework as in claim 15, wherein the plurality of preset rules comprises:

when one of the terminals involved in the command conflict has a history of sending the command at a specific time, executing the command sent by the terminal that sends the command at the specific time;

when one of the terminals involved in the command conflict has a history of sending the command from a specific location, executing the command sent by the terminal that sends the command from the specific location; and executing the command sent by the terminal located closest to the corresponding electronic device when a distance between two terminals involved in the command conflict is greater than a predetermined distance.

17. The framework as in claim 16, wherein:

when the control server determines that a command conflict exists and the command conflict is unresolvable according to the plurality of preset rules, the control server determines which command to execute according to the authority levels of the terminals that sent the command; and the preset rules of the plurality of preset rules to apply for resolving the command conflicts are customizable for each electronic device.

18. The framework as in claim 17, wherein when a command conflict involves terminals communicating with different control servers and the command conflict is unresolvable according to the plurality of preset rules, the control server executes the command sent from the terminal having the highest authority level.

\* \* \* \* \*